United States Patent [19]

Sweeney et al.

[11] 4,355,966
[45] Oct. 26, 1982

[54] AUTOMATIC CONTROL OF BUBBLE SIZE IN BLOWN FILM

[75] Inventors: Edward E. Sweeney, Wenonah; Paul N. Magowan, Moorestown, both of N.J.

[73] Assignee: E. B. Westlake, Jr., Havertown, Pa.; a part interest

[21] Appl. No.: 260,006

[22] Filed: May 4, 1981

[51] Int. Cl.³ ............................................. B29D 23/04
[52] U.S. Cl. ................................. 425/140; 264/40.2; 264/564; 425/72 R; 425/172; 425/326.1
[58] Field of Search ...................... 264/40.3, 40.2, 40.1, 264/564, 569; 425/72 R, 140, 141, 142, 326.1, 172

[56] References Cited

U.S. PATENT DOCUMENTS

| | | | |
|---|---|---|---|
| 3,499,064 | 3/1970 | Tsuboshima et al. | 264/569 |
| 3,522,630 | 8/1970 | Swickard, Jr. | 425/326.1 |
| 3,596,321 | 8/1971 | Upmeier | 425/326.1 |
| 3,886,243 | 5/1975 | Uemura et al. | 264/40.3 |
| 3,980,418 | 9/1976 | Schott, Jr. | 425/326.1 |
| 4,189,288 | 2/1980 | Halter | 264/40.3 |
| 4,201,741 | 5/1980 | Pannenbecker | 264/40.3 |
| 4,243,363 | 1/1981 | Mulcahy | 425/140 |
| 4,246,212 | 1/1981 | Upmeier et al. | 425/326.1 |

FOREIGN PATENT DOCUMENTS 2038038 7/1980 United Kingdom ............... 264/40.2

*Primary Examiner*—Jeffery R. Thurlow
*Attorney, Agent, or Firm*—Max R. Millman

[57] ABSTRACT

A system of automatically controlling the size of thermoplastic blown film to minimize scrap generation by guiding the bubble at an elevation above the melting point of the bubble, to keep it centered above the extrusion die, sensing when the bubble is too wide or too narrow and automatically actuating a means to selectively remove or deliver gas or air to or from the bubble to return the bubble to the predetermined desired diameter of width and sensing when the predetermined diameter or width is obtained.

9 Claims, 6 Drawing Figures

AUTOMATIC CONTROL OF BUBBLE SIZE IN BLOWN FILM

This invention relates to the blown film extrusion process used to make bags of predetermined width from a wide variety of thermoplastic materials with and without fillers.

The conventional process comprises extruding the molten, pressurized thermoplastic material through an annular die to form an endless tube which is led up a tower by a pair of primary nip rolls at the top thereof. Air or gas is used to inflate the tube to a desired diameter. The portion of the film with the trapped air or gas is known as the bubble which is flattened by the primary nip rolls. Air is also blown on the outside of the tube immediately after it leaves the die to aid in the cooling process. The area where the tube is cooled below the melt point of the thermoplastic to reach its final size is known as the frost line, the final thickness of the tube in a specific width being determined by the amount flowing through the die and the speed at which it is being stretched by the primary nip rolls.

An inherent problem encountered in this blown film process is that the width or diameter of the bubble becomes undersized or oversized. It becomes undersized when the air trapped in the bubble escapes slowly through the primary nip rolls or through holes formed in the film caused by defects in the thermosplastic resin or by additives to the resin to obtain special properties, such as carbon in polyethylene resin to produce a semiconductive bag. The width of the bubble becomes oversized when the volume of the air trapped therein is excessive.

Heretofore, the correction of the undersized or oversized bubble was effected manually. When undersized, a valve connected to a source of compressed air was opened to deliver air to the bubble to restore its diameter to the desired dimension. When oversized, a valve was opened manually to vent the air to atmosphere or a hole was punched in the bubble until the diameter of the bubble was restored to its desired dimension. These conventional corrective measures significantly increase the amount of scrap produced.

It is the primary object of the invention to overcome the disadvantages of the current method of manually correcting undersized or oversized blown film by providing automatic means for effecting these corrections, thereby decreasing the amount of scrap produced and continuing to produce the desired product efficiently. Multiple lines may therefore be run requiring only one operator.

Another object of the invention is to provide apparatus and method for automatically controlling the bubble size in blown film by including a means to guide and adjustably center the bubble relative to the die above the frost line, a means to sense bubble undersize and valved means responsive to said sensing means operatively connected to a compressed air or gas supply to deliver air or gas to the bubble until it is restored to its desired diameter.

Another object of the invention is to provide an automatic control system of the character described in which the bubble undersize is of major extent whereby said valved means acts to rapidly deliver a large supply of air to the bubble until it is restored to its desired diameter.

Another object of the invention is to provide an automatic control system of the character described including a means to sense bubble oversize and means responsive to said sensing means to vent air or gas from the bubble until it is restored to its desired diameter.

Another object of the invention is to provide an automatic control system of the character described including a sensing means connected to an indicator operative in response to the desired diameter of the bubble.

The foregoing objects are attained in a preferred embodiment wherein adjustable guide rolls are mounted on the cooling tower above the frost line and adjacent to the extrusion die, a first source of infrared light and receiver are mounted above the guide rolls, valved means operatively connected to said first receiver and to a source of compressed air or gas whereby when the infrared beam does not intersect or touch the bubble said valved means delivers air or gas to the bubble until its diameter is restored to its desired dimension, a second source of infrared light and receiver are mounted above the guide rolls and operatively connected to a venting means, whereby when said infrared beam of said second light source intersects the bubble due to its oversize the venting means is actuated to remove air or gas from the bubble until its diameter is restored to its desired dimension, and a third source of infrared light and receiver connected to an indicator whereby when said third infrared beam is aligned with the desired diameter of the bubble the indicator is either actuated or inoperative as desired. When the undersize of the bubble is major or critically large, the invention is operated to deliver air or gas rapidly and in large volume to the bubble.

These and other objects and features of the invention will become more apparent as the following description proceeds in conjunction with the accompanying drawings, wherein.

Figure 1:
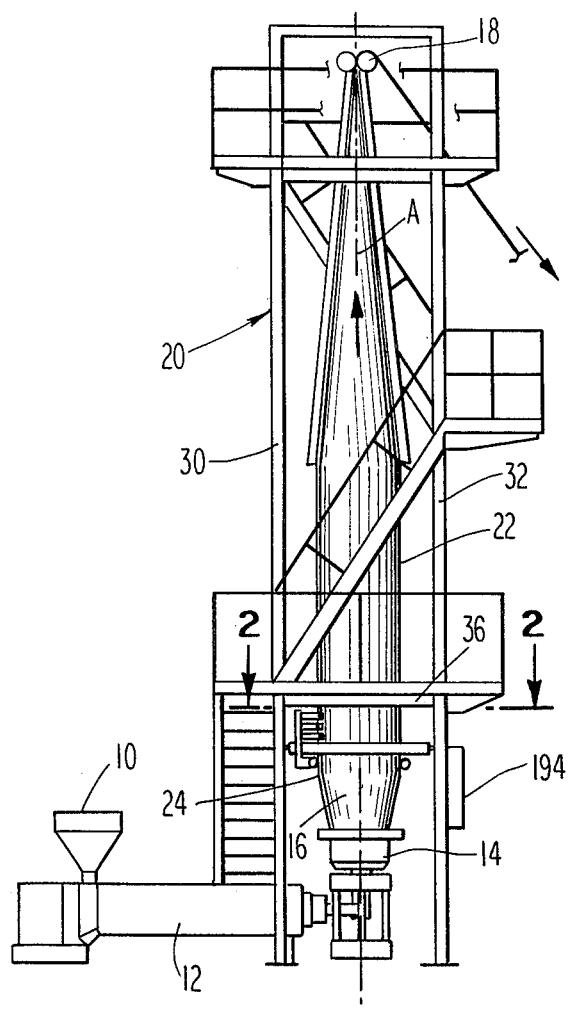
FIG. 1 is a side elevational view of blown film apparatus incorporating the instant invention.
Figure 3:
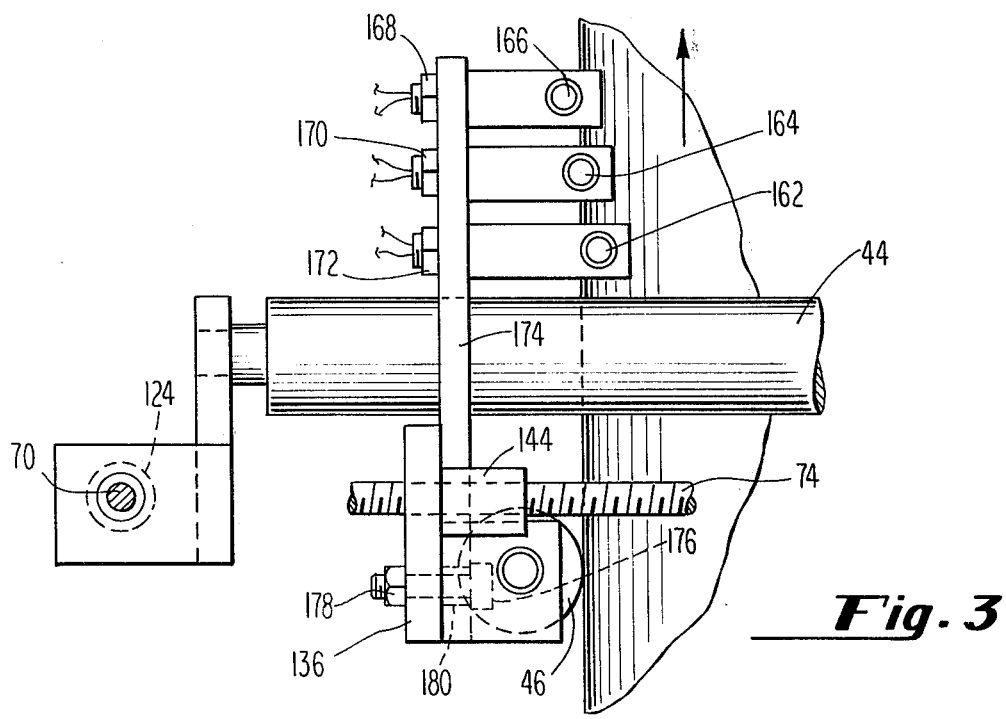
FIG. 3 is a sectional view taken on the line 3—3 of FIG. 2.

Specific reference will now be made to the drawings in which similar reference characters are used for corresponding elements throughout. In a typical blown film extrusion process in which a large number of thermoplastic resins, with and without additives, are placed as pellets, powder, flakes or in granular form in hopper 10 to feed a screw in a conventional extruder 12, the screw conveys the material through a cylinder where it is melted, mixed and pressurized, to an annular die 14 where pressure forces the thermoplastic through the die to form an endless tube 16.

In the start-up, the tube is pulled up and inserted between tight driven nip rolls 18 which are mounted at the top of a cooling tower 20. Air is admitted into the endless tube through the die via a normally closed valve (not shown) which is operatively connected to the plant source of compressed air. The valve is manually opened, admitting air into the tube which forms a bubble 22 between the nip rolls and the die, and when the bubble attains a diameter approximating the flat width desired, the valve is closed. Aside from trapping the air in the bubble, the nip rolls also function to flatten the bubble and the flat material is subsequently conveyed to stations where the material is cut to the desired bag size lengths.

The thermoplastic tube cools in the time period between leaving the die and reaching the nip rolls. Air is blown on the outside of the tube immediately after it leaves the die to assist in this cooling process. The area 24 where the tube has cooled sufficiently to reduce its temperature below the melt point and reach its final size is known as the frost line. The final thickness of the tube in any specific width is determined by the amount of material flowing through the die and the speed at which it is being stretched by the nip rolls.

An inherent problem with this conventional blown film process is that some of the trapped air in the bubble is lost in small amounts by escaping through the nip rolls or by holes formed in the film due to defects in the thermoplastic resin or additive materials therein, such, for example, as carbon in polyethylene to form semiconductive bags. When this occurs, it is necessary to restore the lost air as quickly as possible so that the process can continue to make an acceptable product with the desired predetermined flat width and decrease the amount of scrap produced.

At times, there is too much air in the bubble creating an oversize in which case it is necessary to quickly remove air from the oversize bubble to restore it to the necessary desired diameter.

The present invention is designed to correct the oversized or undersized bubbles as quickly as possible and automatically, not requiring the intervention of an operator to effect the same and allowing the operation of a number of blown film lines simultaneously by only one or, at most, a few operators.

The cooling tower comprises four corner upright members 26, 28, 30 and 32 and appropriate horizontal cross members to form a rigid unitary structure. Spaced a relatively short distance above the frost line the uprights are connected by cross members 34 and 36 which are, in turn, connected by cross members 38 and 40.

Since the instant invention employs sensing means, receptors and controls operative in response to the diametric or radial size of the bubble, i.e. oversize, undersize or normal with respect to the predetermined desired diameter or radius of the bubble (corresponding to the desired flat width of the bag), the invention requires a means to center the bubble 22 along an axis between the juncture of the nip rolls 18 and the center of the die 14 and to guide the bubble as it moves upwardly in the tower 20.

Figure 2:
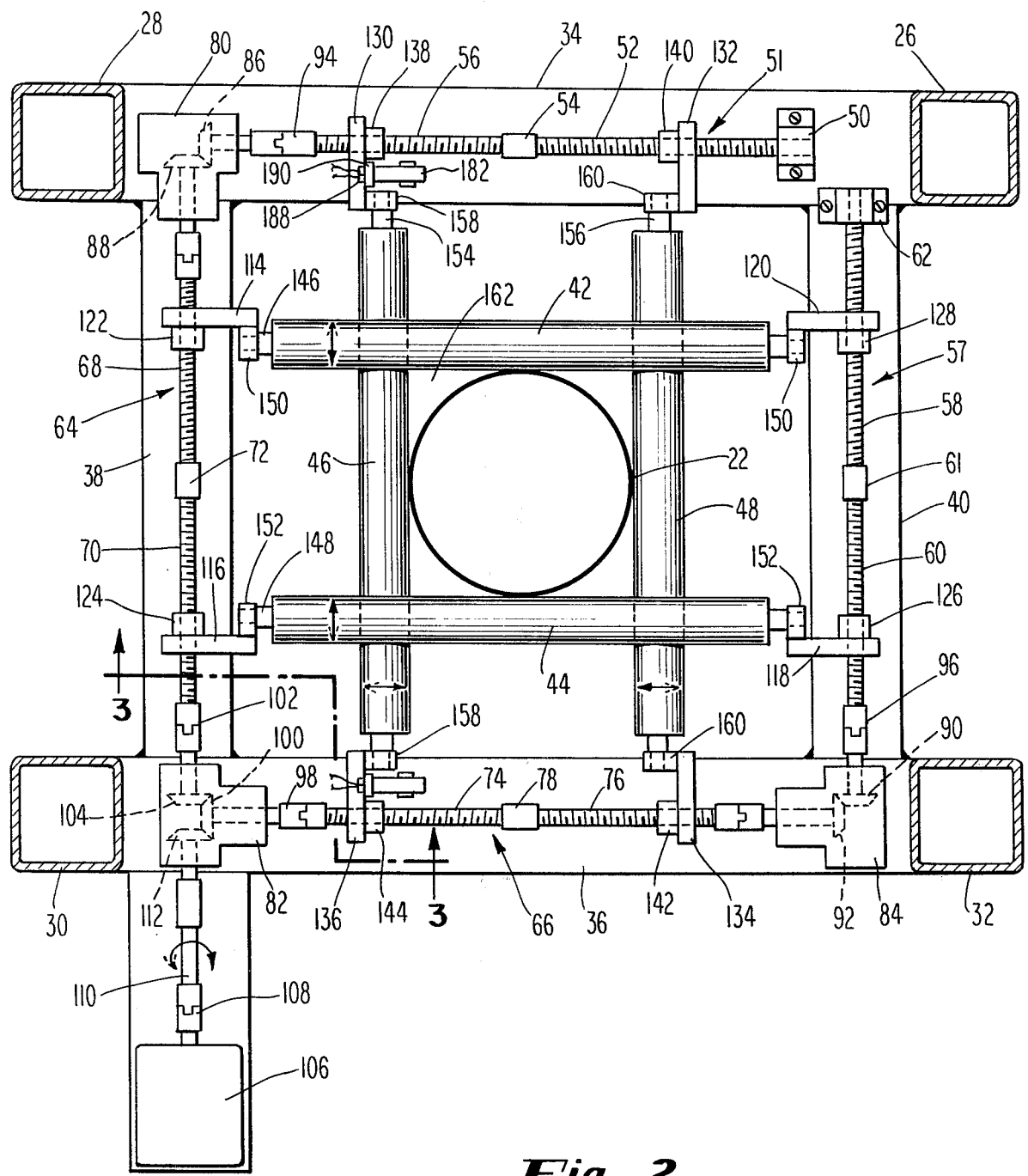
FIG. 2 is an enlarged sectional view taken on the line 2—2 of FIG. 1.

The guide and centering means is shown more particularly in FIG. 2 and comprise guide rolls, two of which 42 and 44 extend horizontally from front to rear of the tower and the other two of which 46 and 48 extend from side to side of the tower, the guide rolls adapted to contact the outer surface of the bubble and rollingly engage the same as it moves upwardly in the tower, the guide and centering means also including a mechanism for adjustably moving the guide rolls 42-48 in unison to accommodate different desired bubble diameters or radii.

Secured upon the cross member 34 adjacent the upright 26 is a bracket 50 which rotatably mounts one end of rod 51 one half section of which, 52, has left hand threads, which section is rigidly connected at at 54 to another half section 56 with right hand threads.

Similarly, a rod extends along the cross member 40 perpendicular to rod 51 and includes two half sections 58 and 60 rigidly joined as at 61, which are oppositely threaded, section 58 having an end portion or pintle which is rotatably received in a bracket 62 mounted at the juncture of cross members 34 and 40.

Two further similarly threaded rods 64 and 66 are provided, rod 64 extending parallel to rod 57 and rod 66 extending parallel to rod 51. Thus, rod 64 includes half sections 68 and 70 rigidly joined as at 72 which are oppositely threaded and rod 66 includes half sections 74 and 76 rigidly joined as at 78 which are also oppositely threaded. The half sections of each of the rods are oppositely threaded and, where it is stated above that one half section has left hand threads and the other, right hand threads, it is understood that these threads may be reversed to obtain the same function.

Appropriately mounted on the cross members 34 and 36 adjacent their juncture with cross members 38 and 40 are gear boxes 80, 82 and 84, the two gear boxes 80 and 84 containing right angle mitered meshing gears 86, 88 and 90, 92. The gear 86 is flexibly connected as at 94 to the end of rod section 56 and the gear 90 is also flexibly connected as at 96 to the end of rod section 60.

The end of rod section 74 is flexibly connected as at 98 to a right angle mitered gear 100 in gear box 82. The end of rod section 70 is flexibly connected as at 102 to a right angle mitered gear 104 in gear box 82. A reversible motor 106 is provided which is flexibly connected as at 108 to a shaft 110, the end of which carries a right angle mitered gear 112 in gear box 82. The gears 104 and 112 mesh with gear 100.

Carriages 114, 116, 118 and 120 are provided having internally threaded collars 122, 124, 126 and 128 which engage rod sections 68, 70, 60 and 58 respectively. Similar carriages 130, 132, 134 and 136 are provided having internally threaded collars 138, 140, 142 and 144 which engage the other rod sections 56, 52, 76 and 74 respectively.

Extending rotatably through the guide rolls 42 and 44 are rods or axles 146 and 148, the ends of which are affixed in collars 150 and 152 respectively which are, in turn, secured to the carriages 114, 120 and 116, 118. Similarly, rods or axles 154 and 156 extend rotatably through the other guide rolls 46 and 48 and are affixed in collars 158 and 160 respectively which are, in turn, secured to the carriages 130, 136 and 132, 134.

Thus, when the reversible motor 106 is energized in one or another direction, the guide rolls will move in unison towards or away from each other adjustably to increase or decrease the central square area 162 between the rolls and thereby predetermine the desired diametric size of the bubble 22. It is to be understood that while motor operation of the screw rods and guide rolls is shown, the same function can be obtained by use of a manual crank.

Mounted for movement with the guide rolls are light sources and sensors or receivers which are operatively connected to controls for bubbles which may be under or over sized. Three light sources 162, 164 and 166, preferably infrared emitters, are provided whose housings are bolted as at 168, 170 and 172 to a vertical plate 174. The plate 174 is adjustably secured to the carriage 136 by means of a bolt 176 and nut 178, the shank of which bolt passes through a slot 180 in the plate 174.

Similarly, light receivers or sensors 182 are provided whose housings are bolted as at 188 to a vertical plate 190 which is, in turn, adjustably bolted to the carriage 130 opposite carriage 136. Three such sensors are employed corresponding to light sources 162, 164 and 166, the light sources and sensors being aligned in a vertical plane parallel to the vertical axis A through the juncture of the nip rolls 18 and the center of the die 14. The light sources and sensors or receivers are commercially available.

Light source 166 is located to emit a beam outwardly of the outer bubble surface 192 and therefore would intersect the bubble when it is oversized and would energize its corresponding receiver 186. Light source 164 is located to emit a beam slightly inward of the outer bubble surface and would energize its corresponding sensor or receiver 184 to control a slightly undersized bubble. Light source 162 is located to emit a beam substantially inward of the outer bubble surface and would energize its corresponding sensor or receiver 182 to control a bubble of major undersize.

Figure 4A:
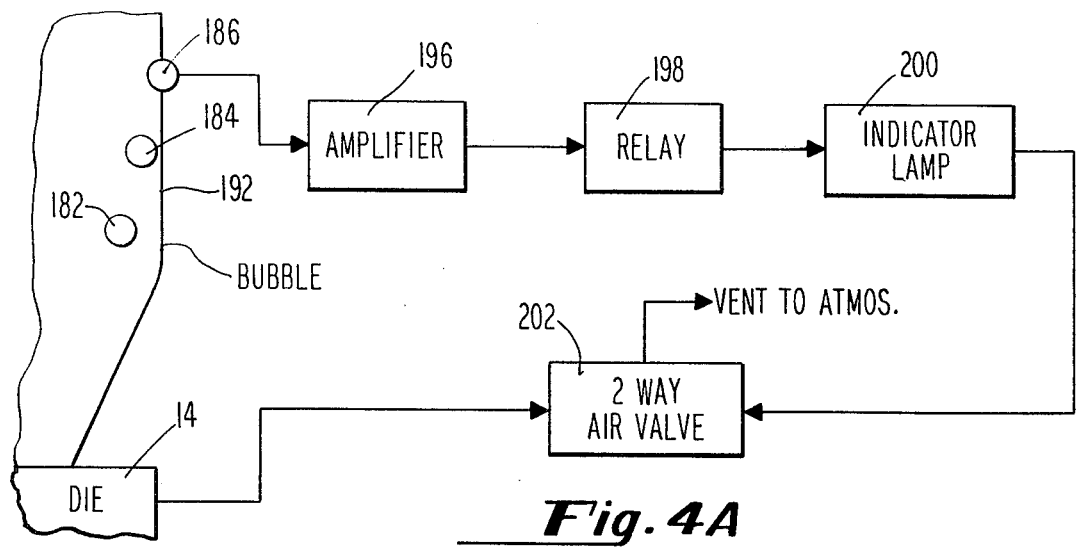
FIG. 4A is a diagrammatic view of the invention operative with respect to an oversized bubble.
Figure 4B:
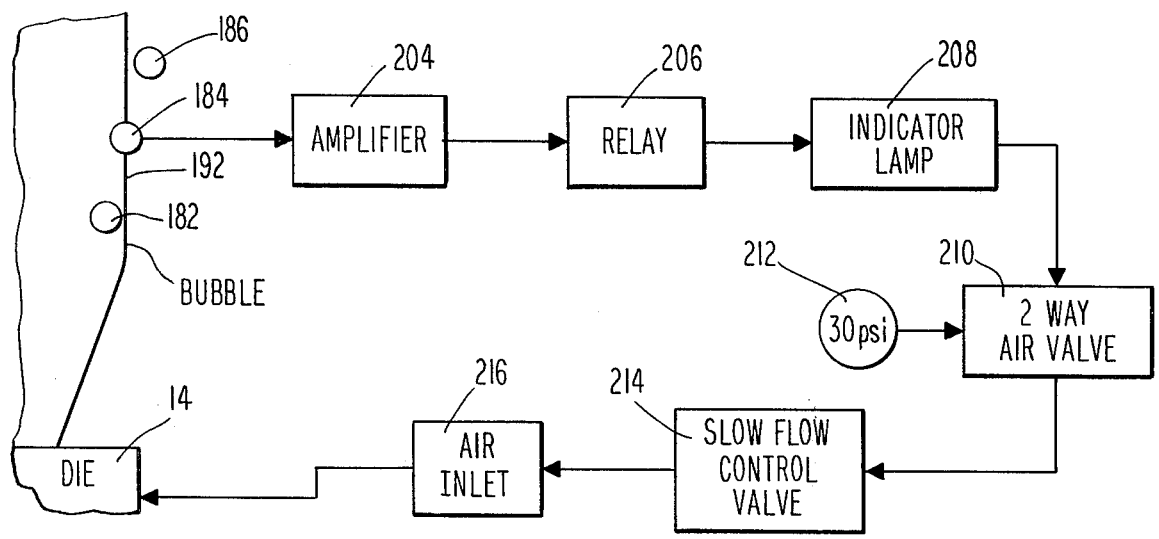
FIG. 4B is a view similar to FIG. 4A showing the invention operative with respect to a correctly sized bubble.
Figure 4C:
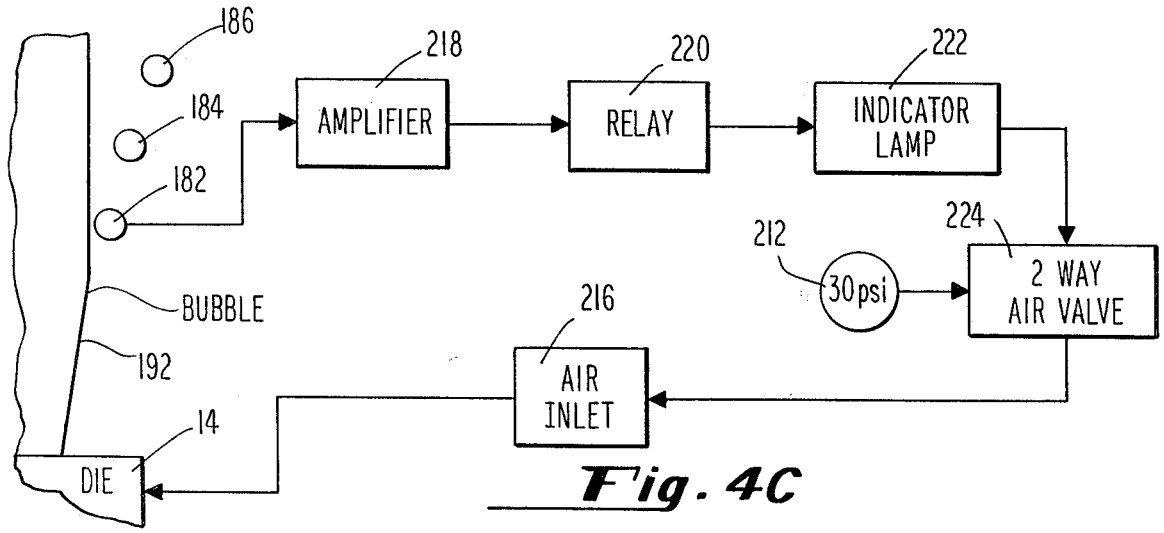
FIG. 4C is a view similar to FIG. 4A showing the invention operative with respect to a grossly undersized bubble.

The control elements and circuits are shown in FIGS. 4A–4C. It will be understood that they are contained in an enclosure 194, see FIG. 1, and operatively connected by suitable wiring to the light sensors or receivers. Also, the indicator lamps will be mounted for display on a face of said enclosure which will also mount the main switch (not shown) for turning on the power.

Referring now to FIG. 4A, when the bubble is oversized, the light beam will pass inwardly of the bubble surface 192 and energize its aligned sensor 186. The sensor is electrically connected to an amplifier 196 which is, in turn, connected to a relay 198, thence to an indicator lamp 200, thence to a 2-way valve 202 which is operatively associated with the die 14. The voltage produced by sensor 186 is amplified sufficiently to trip the relay and light the indicator lamp to show that the bubble is in an oversized condition. The tripped relay actuates the 2-way valve 202 which is normally closed and now opens venting the air or gas from the die and bubble to atmosphere, until the bubble is restored to its desired predetermined diameter at which time the valve closes and the indicator lamp is de-energized.

In FIG. 4B, the bubble is slightly undersized and, hence, the beam from light source 164 is slightly outside the bubble surface 192 whereby the aligned sensor 184 is energized. It is electrically connected to an amplifier 204, thence to a relay 206, thence to an indicator lamp 208, thence to a normally closed 2-way valve 210 which is connected to the plant compressed air 30 psi source 212. The 2-way valve 210 is operatively connected to a slow flow control valve 214 which is connected to the air inlet 216 of the die 14. The voltage output from sensor 184 is amplified to the point where it trips the relay and puts on the lamp to show this slight undersized condition of the bubble. The normally closed 2-way valve 210 is then opened to cause communication between the compressed air source 212 and the slow fire control valve to deliver air slowly to the die and thence to the bubble until it is restored to the desired predetermined diameter, whereupon the valve 210 closes and the indicator lamp is de-energized.

At times, the diameter of the bubble is substantially undersized. This major condition must be rapidly corrected and the operation of the invention in this respect is shown in FIG. 4C.

The beam from light source 162 energizes its aligned sensor 182 which is electrically connected to amplifier 218, thence to relay 220, thence to indicator lamp 222, thence to normally closed 2-way valve 224 which is operatively connected to the plant compressed air source 212 and to the air inlet 216 of the die 14. Thus, the voltage output of sensor 182 is amplified to the point where it trips the relay 220 and puts on the lamp 222 to show the major undersize condition of the bubble. A buzzer (not shown) can also be incorporated in the circuitry to provide a sound signal. The normally closed valve 224 is immediately opened forming a direct communication between the source of compressed air 212 and the die inlet 216 whereby air is rapidly delivered to the bubble until it is restored to its desired predetermined diameter, whereupon the valve 224 closes and the lamp (and buzzer) are de-energized.

It is to be understood that while the control elements and circuits are shown contained in an enclosure 194 mounted on the apparatus per se, they can be located at a remote station. Additionally, when the desired diameter is being maintained in the process, no lights are on at the enclosure 194 except the one associated with the main switch indicating that power is being supplied to the apparatus. If desired, however, additional lamp and circuitry may be provided, similar to that shown in FIG. 4B, which will energize the lamp when the apparatus and process are functioning normally and the desired diameter of the bubble is being maintained.

What is claimed is:

1. In apparatus for making blown film including a cooling tower, nip rolls at the top of the tower engaging the film, a die at the bottom of the tower through which the film is extruded, and means delivering air or gas under pressure to the film to blow it into a bubble; a means to automatically control the size of the bubble above its frost line so that it maintains a predetermined diameter comprising:
   (a) guide and centering means mounted on said tower above and adjacent the die to maintain the bubble centered along an axis between the center of the die and the juncture of said nip rolls,
   (a') said guide and centering means including rotatable rolls engaging the front, back and sides of the bubble and means to adjustably move said rolls in unison,
   (b) light sources mounted to move with said guide and centering means and at predetermined locations relative to the surface of the bubble,
   (c) light sensors mounted in alignment with said source to move with said guide and centering means,
   (d) normally closed valves operatively connected to said sensors, and
   (e) a source of compressed air or gas operatively connected to the valves of two of said sensors whereby when the diameter of the bubble is undersized the beam of one of said light sources will be spaced outwardly of the bubble and said one sensor aligned therewith will cause its valve to open and deliver air or gas to the undersized bubble until it is restored to its predetermined diameter, and when the diameter of the bubble is oversized the beam of another of said light sources will intersect the bubble and the sensor aligned with said other light source will cause its valve to open and vent air or gas from the oversized bubble until it is restored to its predetermined diameter.

2. The apparatus of claim 1 wherein said means to adjustably move said guide rolls in unison includes interconnected rods extending parallel to said guide rolls, each rod including sections oppositely threaded, internally threaded carriages engaging said threaded sections, means operatively connecting said carriages with said guide rolls, and means to rotate said rods.

3. The apparatus of claim 2 wherein said means operatively connecting said carriages with said guide rolls including axles extending rotatably through said guide rolls and collars on said carriages securing the ends of said axles.

4. The apparatus of claim 3 wherein plates are mounted to said carriages connected to ends of one of said guide roll axles, said light sources and sensors being mounted to said plates.

5. The apparatus of claim 1 wherein a control circuit and elements are provided for said undersized bubble corrective function including an amplifier operatively connected to said one sensor, a relay connected to said amplifier, and an indicator connected to said relay, said circuit energizing the normally closed valve connected to said one sensor to open and admit air into said bubble via said die.

6. The apparatus of claim 1 wherein a control circuit and elements are provided for said oversized bubble corrective function including an amplifier operatively connected to said other sensor, a relay connected to said amplifier and an indicator connected to said relay, said circuit energizing the normally closed valve connected to said other sensor to open and vent air from said bubble via said die.

7. The apparatus of claim 5 and an additional normally closed valve connected between said first mentioned valve and said die which opens to admit air slowly into said bubble via said die.

8. In apparatus for making blown film including a cooling tower, nip rolls at the top of the tower engaging the film, a die at the bottom of the tower through which the film is extruded, and means delivering air or gas under pressure to the film to blow it into a bubble; a means to automatically control the size of the bubble above its frost line so that it maintains a predetermined diameter comprising:

(a) rotatable guide rolls mounted on the tower engaging the front, back and sides of the bubble,
(b) means to adjustably move said guide rolls in unison to center the bubble along an axis from the juncture of said nip rolls through the center of the die,
(c) a first light source and first sensor in alignment therewith mounted on said means to adjustably move said guide rolls,
(d) a source of compressed air or gas,
(e) a first normally closed valve operatively interconnecting said compressed air or gas source with said first sensor,
(f) circuitry interconnecting said first sensor and said first valve whereby when the beam of light from said first light source is outwardly spaced from an undersized bubble said first valve opens to deliver air or gas to said bubble until it is restored to its predetermined diameter,
(g) a second light source and second sensor in alignment therewith mounted on said means to adjustably move said guide rolls,
(h) a second normally closed valve operatively connected to said second sensor,
(i) circuitry interconnecting said second sensor and said second valve whereby when the beam of light from said second light source intersects an oversized bubble said second valve opens to remove air from the bubble until it is restored to its predetermined diameter.

9. The apparatus of claim 8 and:
(j) a third light source and third sensor aligned therewith mounted on said means to adjustably move said guide rolls, and
(k) a third normally closed valve connected to said third sensor whereby when the beam of said third light source is spaced a relatively short distance outwardly of the surface of the bubble said third valve opens to admit air or gas to said bubble.

* * * * *